United States Patent [19]

Hanai et al.

[11] Patent Number: 4,812,369

[45] Date of Patent: Mar. 14, 1989

[54] MAGNETIC RECORDING MEDIUM

[75] Inventors: Kazuko Hanai; Yasuyuki Yamada; Takahito Miyoshi, all of Odawara, Japan

[73] Assignee: Fuji Photo Film Co., Ltd., Kanagawa, Japan

[21] Appl. No.: 920,166

[22] Filed: Oct. 17, 1986

[30] Foreign Application Priority Data

Oct. 19, 1985 [JP] Japan ................ 60-232303

[51] Int. Cl.$^4$ ................................ G11B 5/70
[52] U.S. Cl. ................ 428/425.9; 428/694; 428/900
[58] Field of Search ............ 428/425.9, 694, 900

[56] References Cited

U.S. PATENT DOCUMENTS 4,431,700 2/1984 Yamada ................ 428/694
4,477,531 10/1984 Kohler ................ 428/425.9

Primary Examiner—Paul J. Thibodeau
Attorney, Agent, or Firm—Gerald J. Ferguson, Jr.

[57] ABSTRACT

A magnetic recording medium comprising a nonmagnetic support and a magnetic recording layer provided on said support, said magnetic recording layer comprising a ferromagnetic powder dispersed in a binder, which is characterized in that said binder comprises a polyurethane resin which has a repeating unit derived from diol having the formula (I);

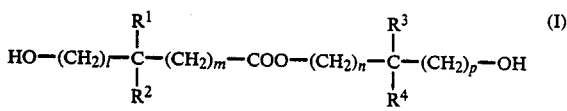

in which $R^1$, $R^2$, $R^3$ and $R^4$ are the same or different from each other, each of $R^1$, $R^2$, $R^3$ and $R^4$ is any one of a hydrogen atom, a saturated or unsaturated aliphatic group having 1-5 carbon atoms, an aromatic group and a cyclic aliphatic group, and at least three substituents among $R^1$, $R^2$, $R^3$ and $R^4$ are not hydrogen atoms; and l, m, n and p are independently integers of 1-3, 0-2, 1-3, and 1-3, respectively.

5 Claims, No Drawings

MAGNETIC RECORDING MEDIUM

BACKGROUND OF THE INVENTION

1. Field of the Invention

The present invention relates to a magnetic recording medium comprising a nonmagnetic support and a magnetic recording layer.

2. Description of prior arts

A magnetic recording medium comprising a nonmagnetic support and a magnetic recording layer is used as an audio tape, a video tape, or a recording medium for a computer system. The magnetic recording medium basically comprises a nonmagnetic support of a resin film having a high strength such as a polyethlene terephthalate resin, and a magnetic recording layer provided on the support. The magnetic recording layer comprises a binder and a ferromagnetic powder dispersed therein.

As a binder material for the magnetic recording layer, there has been conventionally employed a material mainly containing a copolymer having a repeating unit consisting of vinyl chloride, vinyl acetate, and maleic anhydride (hereinafter referred to sometimes as "a vinyl chloride/vinyl acetate-type resin").

Recently, according to the improvement of a recording and reproducing device, etc., a magnetic recording medium at higher level in various properties as compared with a conventional one is desired, and hence a combination of a vinyl chloride/vinyl acetate-type resin and a polyurethane resin has been employed as a binder in place of the conventional binder material. The reason is that the vinyl chloride generally is so rigid as to show relatively poor contact with a magnetic head. The polyurethane resin having low hardness is used in combination with the rigid resin to improve the poor contact.

The polyurethane resin is inherently low in hardness, so that when a magnetic recording medium such as video tape is used under a severe condition such as that in a still mode in which the same surface of the magnetic recording layer is brought into contiuous contact with a rotating magnetic head, the surface of the recording layer is liable to be scratched by the magnetic head.

Particularly in the case of a video tape having a width of 8 mm for the 8 mm-type video system (i.e., 8 mm-type video tape) which has been paid much attention in recent days, reconding of a higher density should be done as compared with the conventional video tape, because the 8 mm type video tape has a narrower width than the conventional video tape. Accordingly, even if a slight scratch is produced, the magnetic recording layer is caused to show prominent decrease in the image quality, and therefore the magnetic recording layer of the 8 mm type video tape is required to have much higher running endurance than the conventional video tape.

SUMMARY OF THE INVENTION

It is an object of the present invention to provide a novel magnetic recording medium.

It is another object of the invention to provide a magnetic recording medium improved in the running endurance.

There is provided by the present invention a magnetic recording medium comprising a nonmagnetic support and a magnetic recording layer provided on said support, said magnetic recording layer comprising a ferromagnetic powder dispersed in a binder, which is characterized in that said binder comprises a polyurethane resin which has a repeating unit derived from diol having the formula (I):

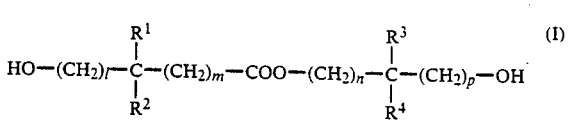

in which $R^1$, $R^2$, $R^3$ and $R^4$ are the same or different from each other, each of $R^1$, $R^2$, $R^3$ and $R^4$ is any one of a hydrogen atom, a saturated or unsaturated aliphatic group having 1–5 carbon atoms, an aromatic group and a cyclic aliphatic group, and at least three substituents among $R^1$, $R^2$, $R^3$ and $R^4$ are not hydrogen atoms; and l, m, n and p are independently integers of 1–3, 0–2, 1–3, and 1–3, respectively.

In the magnetic recording medium of the invention, a polyurethane resin having as a polyol component a repeating unit derived from diol having the above formula (I) is employed as a component for the formation of a recording layer, so as to decrease an occurrence of damages on the magnetic recording layer caused by the contact between the recording layer and the magnetic head. Accordingly, the magnetic recording medium of the invention shows high running endurance (i.e., high abrasive resistance).

DETAILED DESCRIPTION OF THE INVENTION

A magnetic recording medium of the invention basically comprises a nonmagnetic support and a magnetic recording layer provided on the support which comprises a ferromagnetic powder dispersed in a binder.

As a material of the nonmagnetic support, there can be mentioned those conventionally employed. Examples of the nonmagnetic support material include synthetic resin films such as films of polyethylene erephthalate, polyropylene, polycarbonate, polyethylene naphthalate, polyamide, polyamideimide, and polyimide; and metallic foils such as aluminum foil and stainless steel foil. The thickness of the support generally is in the range of from 3 to 50 μm, preferably in the range of from 5 to 30 μm.

The nonmagnetic support may have a back layer (i.e., backing layer) on the opposite side of the side where a magnetic recording layer is to be coated.

The magnetic recording medium of the invention has the nonmagnetic support coated thereupon with a magnetic recording layer comprising a ferromagnetic powder dispersed in a binder, as described hereinbefore.

There is no specific limitation on the ferromagnetic powder employable in the invention. Examples of the ferromagnetic powder include a metal oxide-type ferromagnetic powder such as a ferromagnetic metal powder mainly containing iron, $\gamma\text{-}Fe_2O_3$ or $Fe_3O_4$ and a modified metal oxide-type ferromagnetic powder such as Co-modified iron oxide, modified barium ferrite or modified strontium ferrite.

As a typical ferromagnetic metal powder, there can be mentioned a ferromagnetic alloy powder containing a metal component of at least 75 wt.% in which at least 80 wt.% of the metal component comprises at least one ferromagnetic metal or metal alloy (e.g., Fe, Co, Ni, Fe-Co, Fe-Ni, Co-Ni, Fe-Zn-Ni or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide. Processes for the preparation of those ferromagnetic metal powders are already known, and the ferromagnetic metal powder employed in the invention can be prepared by the known processes.

Also known are processes for the preparation of the metal oxide-type ferromagnetic powder and the modified metal oxide-type ferromagnetic powder, and those processes can be applied to the preparation of the ferromagnetic powder employed in the present invention.

There is no specific limitation on the shape of the ferromagnetic powder employable in the invention, but generally used is a ferromagnetic powder in needle shape, grain shape, dice shape, rice shape or plate shape.

In the magnetic recording layer, a binder is contained in an amount of 10-100 parts by weight, preferably 20-50 parts by weight, based on 100 parts by weight of the above-mentioned ferromagnetic powder.

The magnetic recording medium of the invention is principally characterized in that binder contains a polyurethane resin which has a repeating unit derived from diol having the formula (I):

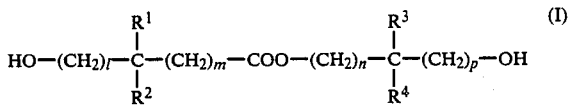

in which $R^1$, $R^2$, $R^3$ and $R^4$ are the same as or different from each other, each of $R^1$, $R^2$, $R^3$ and $R^4$ is any one of a saturated or unsaturated aliphatic group, aromatic group and cyclic aliphatic group having a hydrogen atom and 1-5 carbon atoms, and at least three substituents among $R^1$, $R^2$, $R^3$ and $R^4$ are not a hydrogen atom; and l, m, n and p are independently an integer of 1-3, 0-2, 1-3, and 1-3, respectively.

In the formula (I), each of $R^1$, $R^2$, $R^3$ and $R^4$ is preferably an alkyl group having 1-3 carbon atoms, and all of $R^1$, $R^2$, $R^3$ and $R^4$ are preferably methyl groups. l, m, n and p in the formula (I) preferably are 1, 0, 1 and 1, respectively.

Accordingly, the most preferred compound among the diols having the formula (I) is a compound having the formula (II):

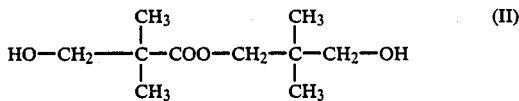

The diol of the formula (I) can be prepared, for instance, by a conventional method of esterification using a corresponding diol compound and a hydroxycarboxylic acid.

A polyurethane resin is generally synthesized by a reaction of polyol with polyisocyanate. In the present invention, diol having the above formula (I) is employed as a polyol component of the polyurethane resin.

All of the polyol used in the preparation of the polyurethane resin which is a component of the binder of the magnetic recording layer are not necessarily diols having the formula (I), and a portion thereof can be replaced with an aliphatic polyol or aromatic polyol. In this case (namely, the case of using aliphpatic polyol or aromatic polyol in combination with diol having the formula (I)), at least 20 mol.% of the whole polyol is preferably the diol having the formula (I). If the amount of diol having the formula (I) is less than 20 mol.%, the magnetic recording layer of the resulting medium cannot be sufficiently improved in the running endurance.

The polyurethane resin composing a binder of the recording layer can be prepared in the conventional manner by using diol having the formula (I).

A polyurethane resin in generally prepared by a reaction of a polyisocyanate compound with a polyol as stated hereinbefore, but in the present invention it is preferred to prepare it by a process comprising the steps of first subjecting the polyol and a polybasic acid to reaction with each other to produce a hydroxy polyester, and then subjecting the hydroxy polyester to reaction with a polyisocyanate compound.

For instance, a diol having the formula (I) (containing other polyol component, if desired) is caused to react with a polybasic acid (e.g., dicarboxylic acid) to produce a hydroxy polester which is a reaction product, and the hydroxy polyester is then caused to react with a polyisocyanate to prepare a polyurethane resin. Those reactions are already known and can be performed according to the conventional manner.

Examples of other polyol components employable in the invention include trimethylolpropane, hexanetriol, glycerol, trimethylolethane, pentaerythritol, and glycols such as ethylene glycol, propylene glycol, butylene glycol and diethylene glycol.

As examples of the carboxylic acid among the polybasic acids, there can be mentioned phthalic acid, adipic acid, dimerized linolenic acid and maleic acid.

The amounts of the polyol component and the polybasic acid are determined in such a range that the carboxylic acid group of the polybasic acid does not remain in the reaction product. If the acid value of the resulting hydroxy polyester is excessively high, the reactivity thereof with the polyisocyanate decreases.

The hydroxy polyester produced as above generally has a number-average molecular weight of 500 to 8,000.

Examples of the polyisocyanate include a reaction product of 3 moles of diisocyanate (e.g., diphenylethane-4,4'-diisocyanate, tolylene diisocyanate or xylylene diisocyanate) and 1 mole of trimethylolpropane, a buret adduct compound of 3 moles of hexamethylene diisocyanate, an isocyanurate adduct compound of 5 moles of tolylene diisocyanate, an isocynurate adduct compound of 3 moles of tolylene diisocyanate and 2 moles of hexamethylene diisocyanate, and a polymer of diphenylmethane diisocyanate.

The reaction conditions are determined in such a manner that the number-average molecular eight of the resulting polyurethane resin is made in the range of 10,000-200,000, preferably 15,000-60,000.

The reason why the magnetic recording layer of the present invention shows high abrasive resistance has not been clarified yet, but it is presumed that the polyurethane resin is denatured as described below by using a diol having the formula (I), whereby the abrasive resistance of the resulting recording layer is improved. That is, the diol compound having the formula (I) has at least three side chains (preferably, four side chains) such as an alkyl group in a molecule, such structure being different from other known polyols, so that the employment of the diol compound having the formula (I) as a polyol component of the polyurethane resin provides a polyurethane resin with a low crystallinity. The polyurethane resin having a low crystallinity has a low density, and therefore has a high glass transition point.

When a magnetic recording medium runs at a high speed under the condition that a magnetic recording layer is in contact with a magnetic head, a frictional heat generally generates on the surface between the recording layer and the magnetic head, and the binder in the magnetic recording layer is liable to soften because of the frictional heat. If the running procedure of the magnetic recording medium is continued under such conditions, the magnetic recording layer receives thereon increased contact pressure. The portion of the recording layer under such contact pressure is distorted, whereby the surface of the recording layer is damaged in the running procedure (namely, running damage).

According to the present invention, the high glass transition point of the polyurethane resin contained in the binder of the magnetic recording layer, which is resistant to the softening under the contact pressure, provides a magnetic recording medium having a magnetic recording layer free from a running damage. In other words, the increase of the glass transition point of the polyurethane resin improves both of a thermophysical property and a thermal stability under humid conditions. By the employment of a polyurethane resin improved in those properties, there can be obtained a magnetic recording layer hardly suffering damage caused by the contact with a magnetic head and showing high running endurance (i.e., high abrasive resistance). A polyurethane resin improved in the above-mentioned properties can still keep other excellent properties inherently belonging to the polyurethane resin.

In the diol having the formula (I) employed in the invention, unlike a polyol having an ester bonding which is conventionally employed in the preparation of a polyurethane resin, the ester bonding in a molecule is sterically protected by side chains present in the vicinity of the ester bonding such as alkyl groups. For this reason, the polyurethane resin is hardly denatured by the hydrolysis in the preparation of a magnetic paint, and hence the excellent properties of the polyurethane resin are not decreased. Further, the excellent properties of the recording medium are maintained, because the polyurethane resin is not denatured by the hydrolysis even under the conditions of a high temperature and a high humidity.

The polyurethane resin can be employed singly as a binder, but generally employed in combination with other resin. In the case of using the polyurethane resin by mixing with other resin, the amount of the polyurethane resin is preferably not less than 10 wt.% of the whole amount of the binder.

Examples of the binder material employable in combination with the above-stated polyurethane resin include vinyl chloride/vinyl acetate copolymer, vinyl chloride/vinyl acetate copolymer containing vinyl alcohol, maleic anhydride and/or acrylic acid, vinylidene chloride/vinyl chloride copolymer, vinylidene chloride/acrylonitrile copolymer, ethylene/vinyl acetate copolymer, cellulose derivatives such as nitrocellulose, acrylic resin, polyvinyl acetal resin, polyvinyl butyral resin, epoxy resin, and phenoxy resin. Among these resins, preferred is vinyl chloride/vinyl acetate copolymer containing vinyl alcohol, maleic anhydride and/or acrylic acid, and more prefereed is vinyl chloride/vinyl acetate/maleic anhydride copolymer.

A polyisocyanate compound can be employed in the preparation of a magnetic recording layer of the recording medium.

The magnetic recording medium of the invention may contain an abrasive having a Mohs' scale of hardness of not less than 6 in the magnetic recording layer. The abrasive employable in the invention can be selected from those conventionally employed. Examples of the abrasive include $\alpha$-$Al_2O_3$, $\gamma$-$Al_2O_3$, SiC, $Cr_2O_3$ and $\alpha$-$Fe_2O_3$. It is preferred to employ $\alpha$-$Al_2O_3$ (mean particle size: 0.1–0.6 $\mu$m) and $\gamma$-$Al_2O_3$ (mean particle size: 0.01–0.1 $\mu$m) in combination with each other in a ratio of 55 : 45-95 : 5, ($\alpha$-$Al_2O_3$ : $\gamma$-$Al_2O_3$), by weight.

The abrasive is generally contained in the magnetic recording layer in the amount of 0.2–10 parts by weight based on 100 parts by weight of the ferromagnetic metal powder.

Into the magnetic recording layer of the recording medium is preferably incorporated carbon black to give conductivity, etc., in addition to the abrasive.

The magnetic recording medium of the present invention can be prepared by the following process.

In the first place, the above-mentioned ferromagnetic powder, binder and other additives such as an abrasive and a filler, if necessary, are kneaded in a solvent to prepare a magnetic paint. The solvent employable for kneading in the present invention can be selected from those conventionally employed for the preparation of a magnetic paint. There is no specific limitation on the kneading method or the order of addition of each component.

In the preparation of the magnetic paint, other known additives such as a dispersing agent, an antistatic agent and a lubricant can be also employed.

In the second place, the magnetic paint prepared as above is coated on the aforementioned nonmagnetic support. The magnetic paint can be coated directly on the nonmagnetic support, but it is possible to provide an adhesive layer to combine the magnetic paint layer with the nonmagnetic support.

The magnetic recording layer generally has a thickness (after dryness) of 0.5–10 $\mu$m, preferably 1.5–7.0 $\mu$m.

The magnetic recording layer provided on the nonmagnetic support is generally subjected to a treatment of orienting the ferromagnetic powder contained in the magnetic recording layer, that is, a magnetic orientation, and then subjected to a drying process. If, necessary, a smoothening process is further applied. The magnetic recording medium having been subjected to these processes such as the smoothening process is subsequently cut to give a recording medium having a desired shape.

In the magnetic recording medium of the invention, since the magnetic recording layer shows high running endurance (high abrasive resistance), a running damage is less occurred on the magnetic recording layer. As a result, satisfactory electromagnetic conversion characteristics are maintained for a long period of time in the magnetic recording medium of the invention.

The examples and the comparison example of the present invention are given below. In the following examples, the expression "part(s)" means "part(s) by weight", otherwise specified.

EXAMPLE 1

The components indicated below were kneaded for 48 hours in a ball mill to give a dispersion.

| | |
|---|---|
| Co-containing γ-Fe₂O₃ (Hc: 630 Oe, mean particle size: 0.33 μm) | 300 parts |
| Vinyl chloride/vinyl acetate/maleic anhydride copolymer (maleic anhydride: 0.6 wt. %, mean polymerization degree: 340) | 35 parts |
| Polyurethane resin | 26 parts |
| Abrasive (α-alumina, mean particle size: 0.5 μm, γ-alumina, mean particle size: 0.02 μm, α-alumina: γ-alumina = 78:22) | 24 parts |
| Conductive carbon black | 15 parts |
| Myristic acid | 7 parts |
| Butyl stearate | 1 part |
| Methyl ethyl ketone | 546 parts |
| Butyl acetate | 234 parts |

The above-mentioned polyurethane resin was prepared in the following manner.

To a mixture of 0.8 mole of diol having the formula (II) and 0.2 mol of butanediol was added 1 mole of adipic acid to prepare a polyester of adipic acid. In the procedure, the reaction conditions such as a reaction temperature were determined in such a manner that the reaction product would have a number-average molecular weight of approx. 2,000.

Thus obtained reaction product was caused to react with the same mole of diphenylmethane-4,4'-diisocyanate to prepare the polyurethane resin. The polyurethane resin had a number-average molecular weight of approx. 30,000.

To the dispersion obtained as above was added 16 parts of a polyisocyanate compound (Colonate L, available from Nippon Polyurethane Co., Ltd.), and the mixture was kneaded for one hour. The resulting dispersion was filtered by a filter having a mean pour size of 1 μm to give a magnetic paint.

The magnetic paint was coated over a polyethylene terephthalate support (thickness: 10 μm) to give a coated layer of thickness of 4.0 μm (in dry state) by means of a reverse roll. The support with the coated layer was then treated with an electromagnet at 3,000 gauss under wet condition to give magnetic orientation. After the coated layer was dried, the dried layer was subjected to supercalendering. The resulting sheet was slit to give a video tape (VHS-type video type) having ½ inch width.

A signal of 4 MHz was input into the resulting video tape in a video recorder (NV-8300 type available from Matsushita Electric Industrial Co., Ltd.), and then the recorded signal was continuously reproduced in a still mode for 30 minutes.

After the reproduction procedure, the surface of the magnetic recording layer of the video tape was observed by the use of a scanning electron microscope at 1,000 magnifications and 5,000 magnifications.

It was confirmed that the surface of the magnetic recording layer had some strongly rubbed portions where the binder was pressed to make the ferromagnetic particles in the continuous state and each ferromagnetic particle was hardly found independently. It was also confirmed that shallow scratches (running damages) were observed on the surface of the magnetic recording layer, but such deep scratches as to reach the nonmagnetic support were not observed.

The observation of the surface of the magnetic recording layer with respect to the video tapes prepared in the following examples and comparison example was carried out in the same manner as described above.

EXAMPLE 2

The procedure of Example 1 was repeated except that the diol having the formula (II) and butanediol were used in the amounts of 50 mol.% and 50 mol.%, respectively, to prepare a VHS type video tape.

As a result of the observation on the surface of the magnetic recording layer of the video tape, scratches were found all over the surface. However, those scratches were shallow and any scratch reaching the nonmagnetic support was not found.

EXAMPLE 3

The procedure of Example 1 was repeated except that the diol having the formula (II) and butanediol were used in the amounts of 20 mol.% and 80 mol.%, respectively, to prepare a VHS type video tape.

As a result of the observation on the surface of the magnetic recording layer of the video tape, scratches were found all over the surface. However, those scratches were shallow and only a few scratches reaching the nonmagnetic support were found.

COMPARISON EXAMPLE 1

The procedure of Example 1 was repeated except for not using diol having the formula (II) but using only butanediol as a polyol component, to prepare a VHS type video tape.

As a result of the observation on the surface of the magnetic recording layer of the video tape, scratches reaching the nonmagnetic support were found all over the surface.

EXAMPLE 4

The procedure of Example 1 was repeated except that 5 parts of a polyisocyanate compound (Colonate L, available from Nippon Polyurethane Co., Ltd.) was added to a dispersion prepared by kneading the components indicated below for 48 hours and that the slit width of the resulting tape was changed to 8 mm, to prepare an 8 mm type video tape.

| | |
|---|---|
| Ferromagnetic metal powder (Fe—Ni alloy, Ni: 2 wt. %, specific surface area (S-BET): 50 m²/g) | 100 parts |
| Vinyl chloride/vinyl acetate/maleic anhydride copolymer (400 × 110A available from Nippon Geon Co., Ltd., Japan, polymerization degree: 400) | 11 parts |
| Polyurethane resin | 2 parts |
| α-alumina (mean particle size: 0.2 μm) | 10 parts |
| Carbon black (mean particle size: 40 mμ, available from Asahi Carbon Co., Ltd., Japan) | 2 parts |
| Oleic acid | 1 part |
| Stearic acid | 1 part |
| Butyl stearate | 1 part |
| Methyl ethyl ketone | 500 parts |

The above-mentioned polyurethane resin was prepared in the same manner as described in Example 1.

A signal of 5 MHz was input into the resulting video tape in a video recorder (FUJIX-8, tradename of Fuji Photo Film Co., Ltd.), and then the recorded signal was continuously reproduced in a still mode for 30 minutes.

After the reproduction procedure, the surface of the magnetic recording layer of the video tape was observed by the use of a scanning electron microscope at 1,000 magnifications and 5,000 magnifications.

It was confirmed that the surface of the magnetic recording layer had some strongly rubbed portions where the binder was pressed to make the ferromagnetic particles in the continuous state and each ferromagnetic particle was hardly found independently. It was also confirmed that shallow scratches were observed on the surface of the magnetic recording layer, but such a deep scratch as to reach the nonmagnetic support was not observed.

We claim:

1. A magnetic recording medium comprising a nonmagnetic support and a magnetic recording layer provided on said support, said magnetic recording layer comprising a ferromagnetic powder dispersed in a binder, wherein said binder comprises a polyurethane resin which has a repeating unit derived from diol having the formula (I):

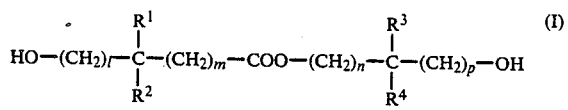

in which $R^1$, $R^2$, $R^3$ and $R^4$ are the same or different from each other, each of $R^1$, $R^2$, $R^3$ and $R^4$ is any one of a hydrogen atom, a saturated or unsaturated aliphatic group having 1-5 carbon atoms, an aromatic group and a cyclic aliphatic group, and at least three substitutients among $R^1$, $R^2$, $R^3$ and $R^4$ are not hydrogen atoms; and l, m, n and p are independently integers of 1-3, 0-2, 1-3 and 1-3, and 1-3, respectively, wherein the amount of the repeating unit having the formula (I) among the diol repeating units which composes the polyurethane resin is not less than 20 mol.%, said polyurethane resin being prepared from a polyester having a number average molecular weight of 500 to 8,000 by reacting a diol containing not less than 20 mol.% of the diol compound of the formula (I) with a dicarboxylic acid which is further reacted with a polyisocyanate).

2. The magnetic recording medium as claimed in claim 1, wherein each of $R^1$, $R^2$, $R^3$ and $R^4$ in the formula (I) is a methyl group.

3. The magnetic recording medium as claimed in claim 1 or claim 2, wherein l, m, n and p in the formula (I) are 1, 0, 1 and 1, respectively.

4. The magnetic recording medium as claimed in claim 1, wherein said polyurethane resin is contained in an amount of not less than 10 wt.% of the total amount of the binder.

5. The magnetic recording medium as claimed in claim 1, wherein said binder further contains a vinyl chloride/vinyl acetate/maleic anhydride copolymer.

* * * * *